United States Patent
Fujita et al.

(10) Patent No.: US 7,035,493 B2
(45) Date of Patent: Apr. 25, 2006

(54) OPTICAL COMMUNICATION SYSTEM

(75) Inventors: Hideaki Fujita, Nara-ken (JP); Yorishige Ishii, Yamatotakada (JP); Toshihiro Tamura, Nara-ken (JP)

(73) Assignee: Sharp Kabushiki Kaisha, Osaka (JP)

( * ) Notice: Subject to any disclaimer, the term of this patent is extended or adjusted under 35 U.S.C. 154(b) by 736 days.

(21) Appl. No.: 10/256,442

(22) Filed: Sep. 26, 2002

(65) Prior Publication Data
US 2003/0058493 A1 Mar. 27, 2003

(30) Foreign Application Priority Data
Sep. 27, 2001 (JP) .............................. 2001-296474
May 9, 2002 (JP) .............................. 2002-134399

(51) Int. Cl.
*G02B 6/42* (2006.01)

(52) U.S. Cl. ......................................... 385/15; 385/24
(58) Field of Classification Search ............ 385/15–24, 385/31–33, 49, 88–94; 398/139, 158–159
See application file for complete search history.

(56) References Cited

U.S. PATENT DOCUMENTS
6,929,405 B1 * 8/2005 Fujita et al. .................. 385/89

FOREIGN PATENT DOCUMENTS
| JP | 01-177004 | 7/1989 |
| JP | 09-148988 | 6/1997 |
| JP | 2000-156664 | 6/2000 |

* cited by examiner

*Primary Examiner*—Phan Palmer
(74) *Attorney, Agent, or Firm*—David G. Conlin; Steven M. Jensen; Edwards Angell Palmer & Dodge LLP

(57) ABSTRACT

Numerical aperture of transmitted light is varied to NAs by a transmitting lens. The numerical aperture, NAs, of the transmitted light is made larger than the numerical aperture, NAp, of an optical fiber, whereby the numerical aperture, NAf, of received light radiated from the optical fiber is made smaller as the transmission distance increases. A receiving optical system is arranged such that the receiving efficiency of the received light is increased by the provision of an aperture member according as the numerical aperture, NAf, is made smaller. This improves the receiving efficiency when the transmission distance is long and reduces a variation in the received light quantity even if the transmission distance is varied.

13 Claims, 10 Drawing Sheets

OPTICAL COMMUNICATION SYSTEM

BACKGROUND OF THE INVENTION

The present invention relates to an optical communication system that can transmit and receive an optical signal via an optical fiber serving as a transmission medium. More particularly, it relates to an optical communication system that can be used for domestic communication, communication among electronic devices, LAN (Local Area Network) and the like.

With the development of information-oriented society, network technology utilizing an optical fiber has become the center of public attention. In particular, the application of an optical communication system utilizing a plastic optical fiber (hereinafter referred to as POF) as a transmission medium to domestic communication, LAN and communication among electronic devices has been advanced.

FIG. 22 shows an example of an optical communication system of the above type. An optical communication system 103 has an optical fiber 2 for transmitting modulated light suited to transmission, based on a data signal to be transmitted, and optical communication modules 101 connected to both end portions of the optical fiber 2 so as to be optically coupled thereto. The optical communication system shown in FIG. 22 is of a minimum construction, and there is a case where the optical communication system has additional optical communication modules 101 and additional optical fibers 102 so as to constitute a network.

There is also a case where optical communication modules manufactured by different manufacturers (optical communication modules having different optical characteristics), or optical communication modules having different communication speeds coexist in the same optical communication system. Thus, an optical communication system is not necessarily constructed of the same optical communication modules.

Optical communication systems 103 can be classified into several types according to their communication modes. When roughly classified, the following cases are exemplified: (1) cases where one optical fiber 2 is used, or a plurality of optical fibers 2 are used; (2) cases where two-way communication of signals is performed, or one-way communication of signals is conducted; and (3) cases where simultaneous (full-duplex) communication of signals is performed, or semi-duplex communication of signals is performed; and the like. Optical communication is established by a scheme in which these modes are used in combination (for example, two-way full-duplex communication is performed via a single-core optical fiber).

In the optical communication system as above, the transmission distance may vary from 1 m to about 100 m according to its use and layout condition. As an optical fiber 2, for example, a multimode optical fiber such as a POF has been proposed. The POF consists of a core made of a plastic having superior optical permeability, such as PMMA (polymethyl methacrylate) and polycarbonate, and cladding made of plastic having a refractive index lower than that of the core. Such an optical fiber 2 makes it easier to increase the diameter of the core from about 200 µm to about 1 mm, in comparison with a quartz optical fiber. Thus, it is easy to adjust the coupling between an optical communication module 101 and the optical fiber 2, and therefore an inexpensive optical communication system 103 can be obtained. A PCF (polymer clad fiber), of which the core is made of quartz glass, and of which the cladding is made of a polymer, may also be used. Although the PCF is more expensive than the POF, the PCF is characterized by having a smaller transmission loss and having a wider transmission band. Therefore, an optical communication system 103 that can perform communication at a longer distance and at a higher speed can be obtained by using the PCF as a transmission medium.

However, in the case where POFs are used as the transmission media, since their transmission loss is larger (about 0.2 dB/m) than that of quartz optical fibers, a difference in transmission loss due to different transmission distances becomes larger. Thus, there is a problem in that a variation in the quantity of received light becomes larger. An optical communication system having a large variation in the quantity of received light requires an increased dynamic range. This disadvantageously complicates the design of the optical communication system and increases production cost.

As a means of solving the above problems, a method has been proposed in which a variation in the quantity of received light depending on the transmission distance is reduced, and those solutions that follow are known.

(1) When the transmission distance is long, optical amplification is performed in the middle of an optical fiber to increase the quantity of light (e.g., JP-A-148988).

(2) In the case where the quantity of received light is changed, a gain of a receiver is switched by using an auto gain control (AGC).

(3) The quantity of light transmitted by a transmitter itself is changed depending on the length of the transmission distance (e.g., 2000-156664).

However, the method (1) in which optical amplification is performed increases cost, and the wavelengths and systems to be used are limited. Thus, the application of this method is only limited to a main line system, and it is difficult to use this method for a short-distance optical communication system utilizing a transmission medium such as a POF.

(2) When an AGC is used, the circuit becomes complicated. Further, a system for detecting the quantity of received light is required in order to switch the gain, which results in an increase in cost.

(3) Also, when the intensity of transmitted light is varied, a system for detecting the transmission distance or the quantity of transmitted light and performing feedback is required. Thus, there is a problem of an increase in cost.

In the optical communication system, as mentioned above, optical communication modules with different communication speeds, and optical communication modules with different optical characteristics may coexist. In such a case, it has been more difficult to suppress the increase in dynamic range due to a variation of the transmission distance.

Incidentally, JP-A-1-177004 discloses that the numerical aperture of transmitted light of an optical communication module is made smaller than the numerical aperture of an optical fiber, whereby the frequency band of a transmission signal is widened and the communicable distance is extended. However, the publication does not disclose any solution to a problem that the received light quantity is varied depending on the length of the transmission distance and the dynamic range increases. Further, according to the technique disclosed in the publication by which the numerical aperture of the optical communication module is made smaller than that of the optical fiber, if a light-emitting diode (LED), which has a large radiation angle, is used as a light emitting element, the optical system becomes complicated, which makes it difficult to achieve reduction in the size and cost of the optical communication module.

SUMMARY OF THE INVENTION

An object of the present invention is to provide an inexpensive optical communication system having a simple construction, which utilizes optical fibers having different transmission distances, wherein a variation in the quantity of received light is small even if the transmission distance is varied, and the variation in the quantity of received light can be kept small even if optical communication modules with different communication speeds or optical communication modules with different optical characteristics are used in combination.

The present inventors studied the variation of distribution of radiated light from optical fibers with different transmission distances. This will be explained with the use of FIG. 1.

FIGS. 1A and 1C and FIGS. 1B and 1D are schematic views showing distributions of radiated light from optical fibers 2 with different lengths. FIGS. 1A and 1C show the case where the optical fiber 2 is short, while FIGS. 1B and 1D show the case where the optical fiber 2 is long. In the case where the numerical aperture, NAs, of transmitted light 4 that is incident on the optical fiber 2 is larger than the numerical aperture, NAp, of the far field pattern (FFP) of the optical fiber 2, and the transmission distance is short (i.e., the optical fiber 2 is short), since the influence of the numerical aperture, NAs, of the transmitted light 4 remains, the numerical aperture, NAf, of received light 5 has a wider distribution than NAp as shown in FIGS. 1A and 1C. In the following description, measurement of NAp is to be conducted according to JIS C6822. On the other hand, in the case where the transmission distance is long (the optical fiber 2 is long), since the influence of the numerical aperture, NAs, of the transmitted light 4 becomes less, the numerical aperture, NAf, of the received light 5 becomes approximately equal to the numerical aperture, NAp, of the optical fiber 2. As described above, it was found that in the case where the numerical aperture, NAs, of the transmitted light 4 is larger than the numerical aperture, NAp, of the far field pattern (FFP) of the optical fiber 2, the numerical aperture, NAf, of radiated light (the received light 5) from the optical fiber 2 became smaller as the transmission distance increased and eventually became approximately equal to the numerical aperture, NAp, of the optical fiber 2. A schematic view illustrating this is shown in FIG. 2.

Next, cases where the numerical aperture, NAs, of the transmitted light 4 is smaller than the numerical aperture, NAp, of the optical fiber 2 are shown in FIGS. 3A and 3C and FIGS. 3B and 3D. As shown in the figures, in the case where the numerical aperture, NAs, of the transmitted light 4 that is incident on the optical fiber 2 is smaller than the numerical aperture, NAp, of the optical fiber 2, and the transmission distance is short (i.e., the optical fiber 2 is short), since the influence of the numerical aperture, NAs, of the transmitted light 4 remains, the numerical aperture, NAf, of the received light 5 has a narrower distribution than the NAp. On the other hand, in the case where the transmission distance is long (the optical fiber 2 is long), since the influence of the numerical aperture, NAs, of the transmitted light 4 becomes less, the numerical aperture, NAf, of the received light 5 becomes approximately equal to the numerical aperture, NAp, of the optical fiber 2 as shown in FIGS. 3B and 3D. Thus, as shown in FIG. 4, opposite from the results shown in FIG. 2, as the transmission distance increases, the numerical aperture, NAf, of the radiated light has a tendency to increase. That is, it was found that, as the transmission distance increased, the distribution of the radiated light 5 was converted into a distribution wherein the influence of the numerical aperture, NAp, of the optical fiber 2 became greater than that of the numerical aperture, NAs, of the transmitted light 4.

The numerical aperture (NA) described above is expressed by NA=sin($\theta$na), where $\theta$na is here defined as a radiation angle that is a half-width at half maximum in the FFP (far field pattern) of radiated light. $\theta$na may be defined as $1/e^2$, or half-width at 5% intensity, and not as half-width at half maximum. Since the numerical aperture (NA) is varied according to the definition, it is required that the numerical aperture (NAs) of the transmitted light 4, the numerical aperture (NAf) of the received light 5 and the numerical aperture (NAp) of the optical fiber 2 be compared by using the same definition. In any definition, the relationship between the numerical aperture values gives a tendency similar to the above. The numerical aperture, NAp, of the optical fiber 2 is determined by the structure of the optical fiber 2, such as the refractive indices of the core and the cladding of the optical fiber 2, and is specific to the optical fiber 2 to be used. The numerical aperture, NAs, of the transmitted light 4 is set by way of an optical source (a light emitting element) and a transmitting optical system.

Positively utilizing a phenomenon in which the numerical aperture is varied because of different transmission distances, and improving optical systems in transmitting and receiving parts of optical communication modules, the present inventors has achieved an optical communication system that reduces the variation in the received light quantity because of the different transmission distances.

Specifically, there is provided, according to one aspect of the present invention, an optical communication system performing data communication among a plurality of optical communication modules using at least a first optical fiber and a second optical fiber having a shorter transmission distance than the first optical fiber, comprising:

means for varying numerical aperture of received light radiated from respective optical fibers after having been propagated therethrough, according to transmission distances of the optical fibers; and means for varying receiving efficiency of an optical communication module that receives the received light, according to the numerical aperture of the received light, wherein the means for varying receiving efficiency of an optical communication module varies the receiving efficiency such that $\eta1>\eta2$ holds, where $\eta1$ represents receiving efficiency of an optical communication module connected to the first optical fiber having the larger transmission distance, and $\eta2$ represents receiving efficiency of an optical communication module connected to the second optical fiber having the shorter transmission distance. $\eta1>\eta2$, namely, the receiving efficiency becomes higher as the transmission distance increases, whereby a variation in the received light quantity due to a difference in the transmission distance between the optical communication modules is reduced. This makes it possible to obtain an optical communication system having a wide range of transmission distances.

Furthermore, both of the means of varying numerical aperture of received light and the means of varying receiving efficiency of an optical communication modules are achievable by adding some contrivance to optical systems of the optical communication modules, and extra circuits or systems are not required. Thus, an inexpensive optical communication system having a simple construction can be obtained.

The means for varying receiving efficiency of an optical communication module may be arranged so as to make the receiving efficiency maximum when received light radiated from an associated optical fiber has a numerical aperture approximate to the numerical aperture of this optical fiber. If so, even if the numerical aperture of transmitted light from a counterpart communication module is unknown, a variation in the received light quantity owing to the difference in the transmission distance can be reduced.

For example, the means of varying numerical aperture of received light according to the transmission distance can be provided by a light emitting element and/or an optical system, such as a lens, incorporated in an optical communication module on the transmission side. Optical fibers themselves having different numerical apertures can serve as such means.

On the other hand, as the means for varying receiving efficiency of an optical communication module, it is possible to use an element that prevent light components of radiated light from the optical fiber from being coupled to an associated light receiving element, said light components being light components having a radiation angle smaller than a radiation angle corresponding to the numerical aperture of the optical fiber and/or light components having a radiation angle larger than the radiation angle corresponding to the numerical aperture of the optical fiber.

Such means can be realized by a receiving optical system. For example, an aperture member which transmits only a part of received light radiated from the optical fiber may be used. Alternatively, a reflecting mirror which reflects only a part of received light radiated from the optical fiber may be used. When using an aperture member, the receiving efficiency can be varied by simply adjusting an opening of the aperture member. On the other hand, when using a reflecting mirror, the receiving efficiency can be varied by adjusting the shape and/or size of the reflecting mirror. Furthermore, a shielding portion may be provided on a receiving optical system, for example a receiving lens, at an outer peripheral portion and/or an inner portion (central portion) thereof. In any of the above cases, the receiving efficiency can be varied depending on the numerical aperture of the received light by a simple and inexpensive structure. According to the present invention, a receiving optical system, wherein the receiving efficiency reaches a maximum when the numerical aperture of the received light is approximate to the numerical aperture of the optical fiber, can be formed in a simple arrangement and at low cost.

Furthermore, the means of varying receiving efficiency of an optical communication module may condense received light radiated from the optical fiber onto an area larger than that of a light-receiving area of an associated light receiving element. In this case also, optical systems can be constructed in simple arrangement and at low cost.

In one embodiment, $NAf1 < NAf2$ and $NAs > NAp$ hold, where $NAf1$ and $NAf2$ represent numerical apertures of received light based on radiated light from the first and second optical fibers, respectively, $NAs$ represents the numerical aperture of transmitted light to enter each optical fiber from an associated optical communication module, and $NAp$ represents the numerical aperture of each optical fiber.

In the optical communication system with the above arrangement, it is possible to vary the numerical aperture of the received light easily depending on the transmission distance through the simple design of the transmitting optical systems of the optical communication modules. Further, when increasing the numerical aperture of transmitted light, it is easy to utilize an LED having a wide radiated-light distribution, and thus there is an advantage that an inexpensive optical communication system can be obtained.

In one embodiment, $NAf1 < NAf2$ and $NAp1 < NAp2$ hold, where $NAf1$ and $NAf2$ represent numerical apertures of received light based on radiated light from the first and second optical fibers, respectively, and $NAp1$ and $NAp2$ represent numerical apertures of the first and second optical fibers, respectively.

In this embodiment, since the numerical aperture of the received light is varied by the optical fiber, the degree of freedom in setting the numerical aperture of the transmitted light from each optical communication module becomes greater, thus making it possible to obtain a less expensive optical communication system with a simpler construction. Further, since the numerical aperture of the optical fiber decrease as the transmission distance increases, reduction of a transmission band due to mode dispersion is mitigated.

In another embodiment, $NAf1 > NAf2$ and $NAs < NAp$ hold, where $NAf1$ and $NAf2$ represent numerical apertures of received light based on radiated light from the first and second optical fibers, respectively, $NAs$ represents the numerical aperture of transmitted light to enter each optical fiber from an associated optical communication module, and $NAp$ represents the numerical aperture of each optical fiber.

This construction can also vary the numerical aperture of the received light easily in a same manner as above, depending on the transmission distance, through the simple design of the transmitting optical systems of the optical communication modules. Thus, an optical communication system wherein a variation in the received light quantity due to different transmission distances can be obtained. Further, when the numerical aperture of the transmitted light is reduced, as a light emitting element, a semiconductor laser having a narrow radiated-light distribution is utilizable. Accordingly, an optical communication system having a wide transmission band can be obtained.

In a further embodiment, $NAf1 > NAf2$ and $NAp1 > NAp2$ hold, where $NAf1$ and $NAf2$ represent numerical apertures of received light based on radiated light from the first and second optical fibers, respectively, and $NAp1$ and $NAp2$ represent numerical apertures of the first and second optical fibers, respectively.

In this embodiment, since the numerical aperture of the received light is varied by the optical fiber, the degree of freedom in setting the numerical aperture of the transmitted light from each optical communication module becomes greater, thus making it possible to obtain a less expensive optical communication system with a simpler construction.

Furthermore, in one embodiment, the plurality of optical communication modules include a first optical communication module and a second optical communication module, and $NAs1 > NAp$ and $NAs2 < NAp$ hold, where $NAs1$ represents the numerical aperture of transmitted light to enter the associated optical fiber from the first optical communication module, $NAs2$ represents the numerical aperture of transmitted light to enter the associated optical fiber from the second optical communication module, and $NAp$ represents the numerical aperture of each optical fiber. That is, the present invention is also applicable to an optical communication system wherein optical communication modules having different communication speeds or optical communication modules having different optical characteristics coexist. In such an optical communication system also, a variation in the received light quantity due to different transmission distances can be suppressed. Furthermore, it is also possible to widen the range of selection of the light source used and to simplify the construction of the transmitting optical system.

For example, in the case where the first optical communication module has a higher upper limit in communication speed than the second optical communication module, a less expensive LED is usable for the first optical communication module, and an LD which can perform high-speed operation is usable as the second optical communication module, respectively. Accordingly, it becomes possible to produce optical communication systems suited to their applications at low cost and with simple construction.

A plastic optical fiber (POF) can be used for each optical fiber. A POF is less in bend loss and hardly breaks. Further, a large core diameter of about 1 mm can easily be made. Therefore, it is easy to make an adjustment in combining an optical fiber with an optical communication module. As a result, a less expensive optical communication system is achievable.

Other objects, features and advantages of the present invention will be apparent from the following description.

BRIEF DESCRIPTION OF THE DRAWINGS

The present invention will become more fully understood from the detailed description given hereinbelow and the accompanying drawings which are given by way of illustration only, and thus are not intended to limit the present invention, and wherein.

DETAILED DESCRIPTION OF THE PREFERRED EMBODIMENTS

Embodiments of the optical communication system of the present invention will be described with reference to the accompanying drawings.

(First Embodiment)

Figure 5:
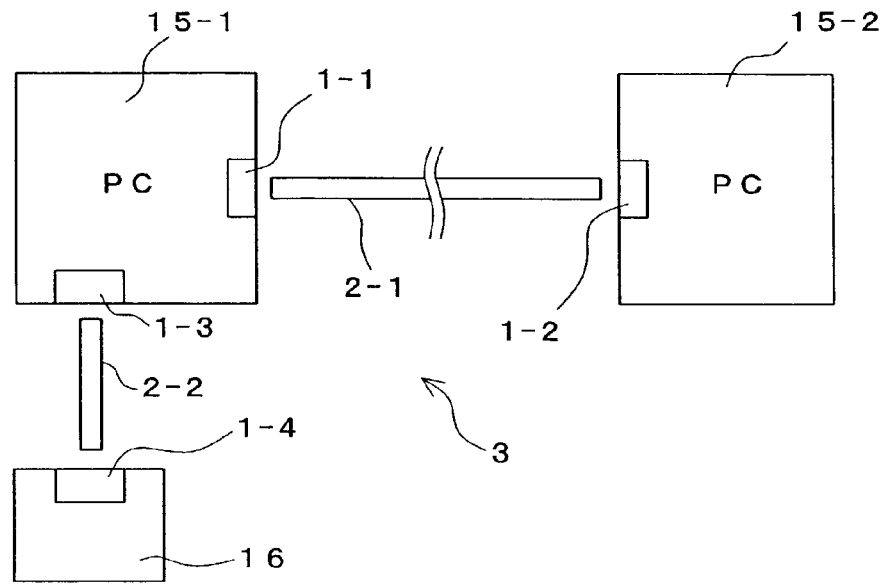
FIG. 5 is a schematic view showing the construction of a first embodiment of an optical communication system in the present invention.

FIG. 5 is a schematic view showing an example of a system in which the optical communication system of the present invention is adopted. The present optical communication system 3 is designed to connect two personal computers (hereinafter referred to as "PCs") 15-1 and 15-2 and an electronic device 16 such as a digital video camera, a digital steel camera, a portable information terminal, a printer or a digital television via optical fibers 2-1 and 2-2.

The PC 15-1 has built-in optical communication modules 1-1 and 1-3. The PC 15-2 and the electronic device 16 have built-in optical communication modules 1-2 and 1-4, respectively. Optical two-way communications is performed between the PC 15-1 and the PC 15-2 by the optical communication modules 1-1 and 1-2, using the optical fiber 2-1 with a longer transmission distance as a transmission medium. Also, between the PC 15-1 and the electronic device 16, two-way optical communications is performed by the optical communication modules 1-3 and 1-4, using the optical fiber 2-2 with a shorter transmission distance as the transmission medium. The optical communication modules 1-1 through 1-4 are the same and thus they are hereinafter denoted by representative reference numeral 1 unless the respective modules are distinguished among them. As to the optical fibers 2-1 and 2-2 as well, they are denoted by representative reference numeral 2 where the two optical fibers are not distinguished between them. The optical fibers 2-1 and 2-2 are removable from the associated optical communication modules 1, so that they can be replaced with optical fibers with different lengths. The present embodiment describes the case where the optical fiber 2-1 is longer than the optical fiber 2-2.

In the optical communication system 3 used in the manner as above, the present invention changes the distribution of light emitted from the optical fiber 2 in accordance with the transmission distance (the length of the optical fiber), and further changes the receiving efficiency of the optical communication module 1 that receives the emitted light, in accordance with the distribution of the emitted light, thereby reducing a variation in the quantity of received light.

Figure 1A:
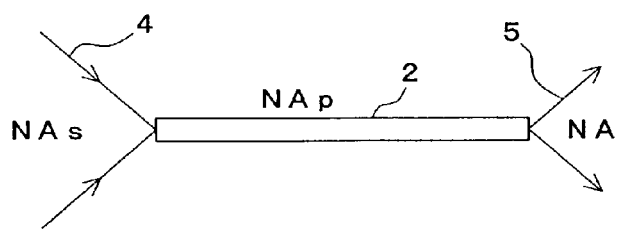
FIGS. 1A and 1C are schematic views showing the numerical aperture of received light in a case in which the numerical aperture of transmitted light is larger than the numerical aperture of an optical fiber and the transmission distance is short.
Figure 1C:
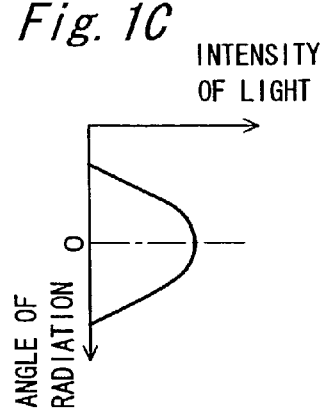
Figure 1B:
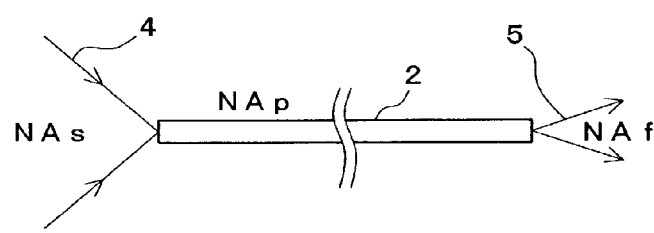
FIGS. 1B and 1D are schematic views showing the numerical aperture of received light in a case in which the numerical aperture of transmitted light is larger than the numerical aperture of an optical fiber and the transmission distance is long.
Figure 1D:
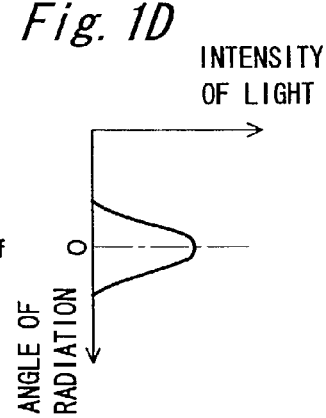
Figure 3A:
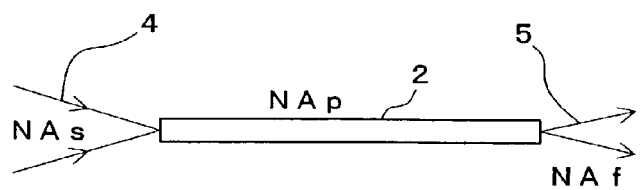
FIGS. 3A and 3C are schematic views showing the numerical aperture of received light in a case in which the numerical aperture of transmitted light is smaller than the numerical aperture of an optical fiber and the transmission distance is short.
Figure 3C:
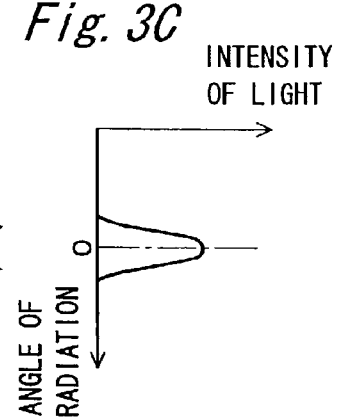
Figure 3B:
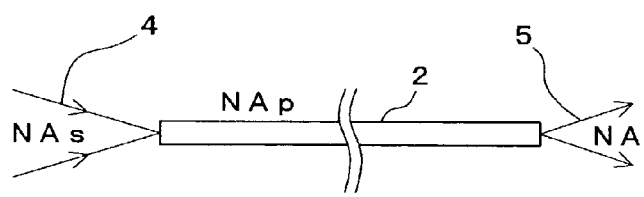
FIGS. 3B and 3D are schematic views showing the numerical aperture of received light in a case in which the numerical aperture of transmitted light is smaller than the numerical aperture of an optical fiber and the transmission distance is long.
Figure 3D:
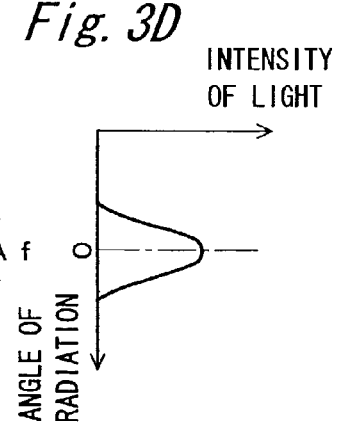
Figure 6:
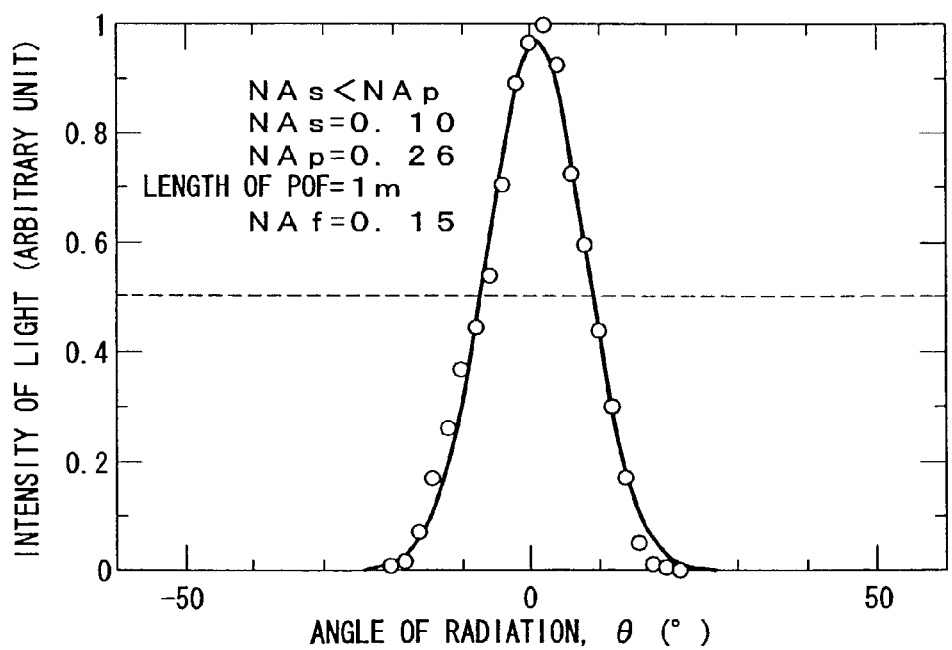
FIG. 6 is a graph showing the FFP measurement results of the numerical aperture of received light in a case in which the numerical aperture of transmitted light is smaller than the numerical aperture of an optical fiber, and the optical fiber is short.
Figure 7:
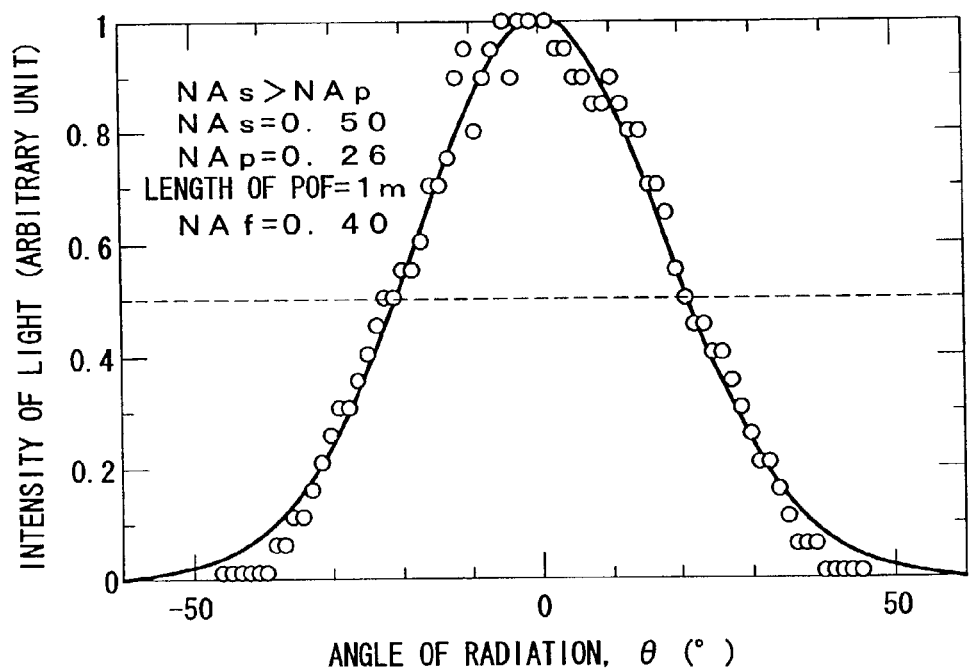
FIG. 7 is a graph showing the FFP measurement results of the numerical aperture of received light in a case in which the numerical aperture of transmitted light is larger than the numerical aperture of an optical fiber, and the optical fiber is short.
Figure 8:
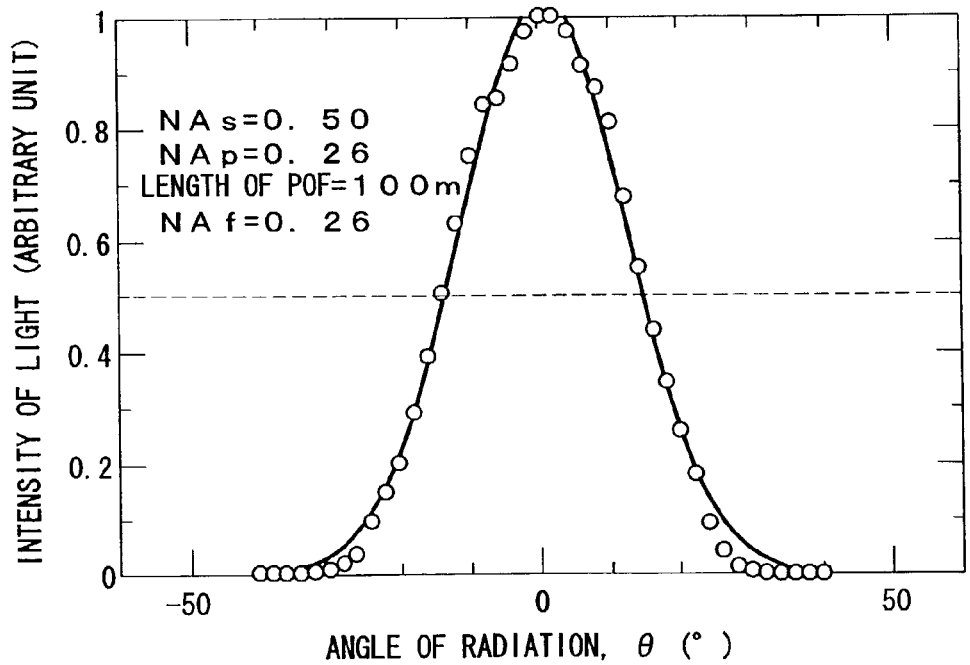
FIG. 8 is a graph showing the FFP measurement results the numerical aperture of received light in a case in which an optical fiber is sufficiently long.

FIGS. 6–8 show the FFP measurement results of the numerical aperture of radiated light, namely, received light outgoing from the optical fiber 2 under different conditions. FIG. 6 shows the measurement results of the FFP of the radiated light (the received light 5) from the optical fiber 2 in the case where the numerical aperture, NAs, of transmitted light 4 is smaller than the numerical aperture, NAp, of the optical fiber 2, and the optical fiber 2 is short (corresponding to FIG. 3A in which NAs=0.1, NAp=0.26, and the optical fiber 2 measures 1 m). FIG. 7 shows the measurement results of the FFP of the radiated light (the received light 5) from the optical fiber 2 in the case where the numerical aperture, NAs, of the transmitted light 4 is larger than the numerical aperture, NAp, of the optical fiber 2, and the optical fiber 2 is short (corresponding to FIG. 1A in which NAs=0.5, NAp=0.26, and the optical fiber 2 measures 1 m). When the optical fiber 2 is short, which measures 1 m, the radiated light (received light 5) is greatly influenced by the numerical aperture, NAs, of the transmitted light 4. Therefore, in the case of FIG. 6, the numerical aperture, NAf, of the received light 5 is 0.15, which is smaller than the numerical aperture, NAp, of the optical fiber 2 that is 0.26. In the case of FIG. 7, the numerical aperture, NAf, of the received light 5 is 0.40, which is larger than the numerical aperture, NAp, of the optical fiber 2 that is 0.26. Further, as shown in FIG. 8, when the optical fiber 2 is sufficiently long, which measures 100 m (corresponding to FIG. 1B and FIG. 3B), without depending on the numerical aperture, NAs, of the transmitted light 4, the numerical aperture, NAf, of the received light 5 reaches a value equal to that of the numerical aperture, NAp, of the optical fiber 2 (FIG. 8 shows the case in which NAs=0.50, although the similar results will also be obtained when NAs=0.10).

Figure 9:
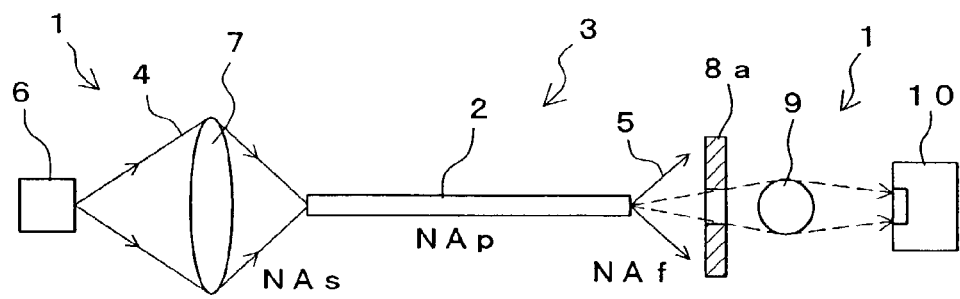
FIG. 9 is a schematic view for describing the construction of a transmitting and a receiving optical communication module in a case in which the numerical aperture of transmitted light is larger than the numerical aperture of an optical fiber.

FIG. 9 shows an example of an optical communication system using transmitting and receiving modules in which the variation of distribution of the radiated light due to different transmission distances shown above is positively used. Here, the numerical aperture, NAs, of transmitted light 4 of an optical communication module 1 is made larger than the numerical aperture, NAp, of an optical fiber 2 (NAs>NAp). Thus, as the length of the optical fiber 2 increases, the numerical aperture, NAf, of received light 5 decreases (namely, when the numerical apertures of received lights from optical fibers 2-1 and 2-2 are designated by NAf1 and NAf2, respectively, NAf1<NAf2). Under this condition, optical systems of optical communication modules 1 are set such that the receiving efficiency of each optical communication module 1 becomes higher as the numerical aperture, NAf, of radiated light decreases (namely, the receiving efficiency η1 of optical communication modules 1-1, 1-2 is larger than the receiving efficiency η2 of the optical communication modules 1-3, 1-4).

In FIG. 9, the numerical aperture of the transmitted light 4 radiated from a light emitting element 6, which is a semiconductor laser or an LED (light-emitting diode), is varied to NAs by a transmitting lens 7 (transmission optical system). Then, the transmitted light 4 is incident on the optical fiber 2. On the other hand, received light 5 with a numerical aperture of NAf is radiated from the optical fiber 2. A part of the received light 5 passes an aperture member 8a and is then condensed by a receiving lens 9 so as to be received by a light receiving element 10 such as a photodiode. The numerical aperture, NAs, of the transmitted light 4 is optionally adjusted by the transmitting lens 7. A part of the received light 5 is cut off by the aperture member 8a, and thus is not coupled to the light receiving element 10. As shown in FIG. 9, the use of the aperture member 8a, which is open at a center portion thereof, makes it possible to attain a receiving optical system wherein the receiving efficiency becomes higher as the numerical aperture, NAf, of the received light 5 decreases.

As shown in FIG. 9, when the numerical aperture, NAs, of the transmitted light 4 is large, it is preferred to use an LED as the light emitting element 6. Since LEDs have larger angles of radiation than semiconductor lasers, transmitted light 4 with a large numerical aperture, NAs, can easily be obtained by using an LED. Also, a driving circuit of the LED is inexpensive, and thus an inexpensive optical communication system 3 can be obtained. However, the LED has difficulty in performing high-speed operation as compared with a semiconductor laser. Therefore, selection between them should be made depending on the transmission band required for the optical communication system 3.

Figure 12:
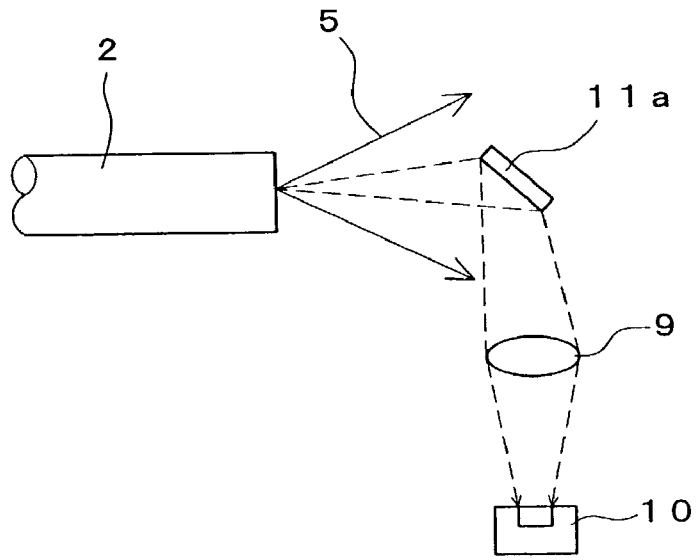
FIG. 12 is a schematic view showing an example of an optical system usable in place of the optical system included in the receiving optical communication module of FIG. 9.

The optical receiving system is not limited to the one using the aperture member 8a. For example, in FIG. 9, a lens having a smaller diameter may be arranged as the light-receiving lens 9, without using the aperture member 8a, so that a part of the received light 5 (an outer peripheral portion thereof) is not coupled to the light-receiving lens 9. Alternatively, as shown in FIG. 12, a reflecting mirror 11a may be arranged in place of the aperture member 8a so that only a radially inside portion of the received light 5 is reflected and condensed by the light-receiving lens 9, whereby all of the received light 5 having a large numerical aperture is not coupled to the light receiving element 10.

Figure 10:
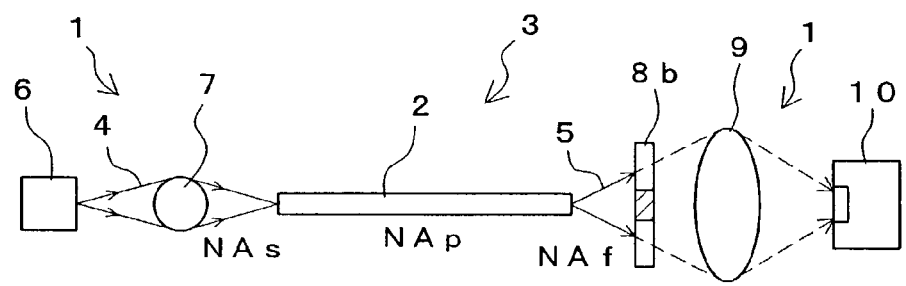
FIG. 10 is a schematic view for describing the construction of a transmitting and a receiving optical communication module in a case in which the numerical aperture of transmitted light is smaller than the numerical aperture of an optical fiber.

FIG. 10 shows an example of an optical communication system using other transmitting and receiving modules. In FIG. 10, components similar to those in FIG. 9 are designated by the same numerals. In this example, the numerical aperture, NAs, of transmitted light 4 of an optical communication module 1 is made smaller than the numerical aperture, NAp, of an optical fiber 2 (NAs<NAp) such that as the length of the optical fiber 2 increases, the numerical aperture, NAf, of received light 5 increases (namely, when the numerical apertures of received lights from optical fibers 2-1 and 2-2 are designated by NAf1 and NAf2, respectively, NAf1>NAf2). Under this condition, optical systems of optical communication modules 1 are set such that the receiving efficiency of each optical communication module 1 becomes higher as the numerical aperture, NAf, of radiated light increases (namely, the receiving efficiency η1 of optical communication modules 1-1, 1-2 is larger than the receiving efficiency η2 of the optical communication modules 1-3, 1-4).

In order to obtain the transmitted light 4 having a small numerical aperture, NAs, easily, a semiconductor laser may be used as a light emitting element 6. With a semiconductor laser, it is also possible to obtain an optical communication system 3 having a wide transmission band. Furthermore, by reducing the numerical aperture, NAs, of the transmitted light 4, mode dispersion caused by propagation of the transmitted light through the optical fiber 2 can be reduced, which is advantageous in widening the transmission band. As described above, the numerical aperture, NAs, of the transmitted light 4 and the light emitting element 6 are determined or selected in accordance with the transmission band required and application of the optical communication system 3.

Figure 13:
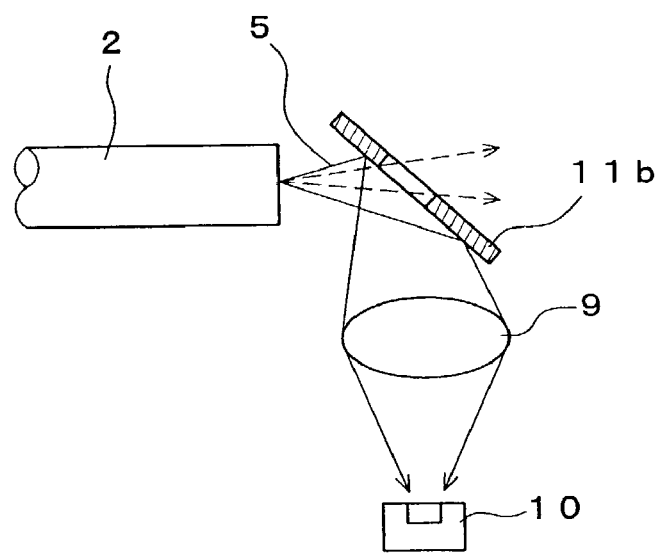
FIG. 13 is a schematic view showing an example of an optical system usable in place of the optical system included in the receiving optical communication module of FIG. 10.

As shown in FIG. 10, provision of an aperture member 8b having an opening in its peripheral portion realizes a receiving optical system wherein the receiving efficiency becomes higher as the numerical aperture, NAf, of the received light 5 increases. As the receiving optical system, as shown in FIG. 13, a reflection mirror 11b having the opposite construction to that of the reflection mirror shown in FIG. 12 may be used such that only an outer peripheral portion of the received light is reflected and then condensed by the receiving lens 9, so that a center portion of the received light 5 having a small numerical aperture is not coupled to the light receiving element.

Preferably, the above-described light emitting element 6 should have a wavelength at which the transmission loss of the optical fiber 2 to be used is less, and should also be available at low cost. For example, when a POF is used as the optical fiber 2, a semiconductor laser having a wavelength of 650 nm, which is mass-producible for DVDs and so on, may be used. When a semiconductor laser is used as the light emitting element 6, a monitoring photodiode (not shown) may be arranged in the rear thereof, thus making it possible to maintain the light quantity of the light emitting element 6.

As the light receiving element 10, a photodiode is used which converts the intensity of received modulated light into an electrical signal and which is highly responsive in the wavelength region of the light emitting element 6. For example, a PIN photodiode, an avalanche photodiode and so on may be used.

Figure 11:
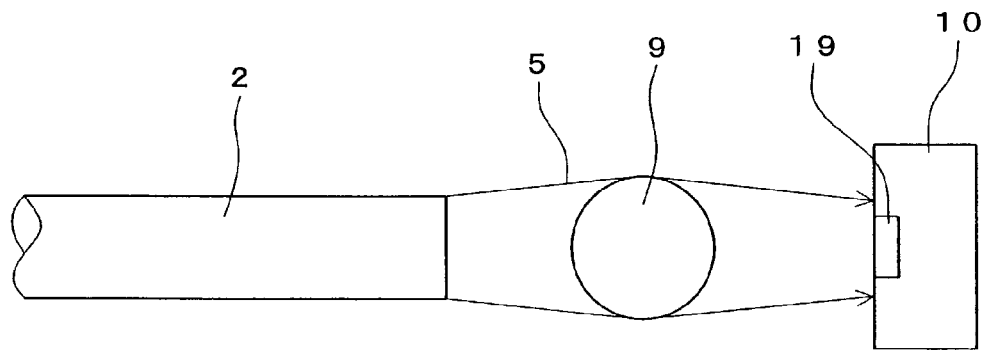
FIG. 11 is a schematic view showing an example of a receiving optical system in the present invention.

The transmitting lens (transmitting optical system) 7, the receiving lens (receiving optical system) 9 are not limited to lenses. For example, as alternatives, a curved-surface mirror, a hologram element and the like may be used as long as they condense the transmitted light 4 or the received light (convert the NA). Alternatively, the radiation angle of the light emitting element 6 may serve as the numerical aperture, NAs, of the transmitted light 5 as such, without using a transmitting optical system. Also, the aperture member is not limited to the above-described ones 8a and 8b, and any aperture member may be used, provided that it can vary the receiving efficiency depending on the numerical aperture, NAf, of the received light 5. For example, an aperture member in which there is no opening, but the transmittance is varied in accordance with position may be used. As another example of the receiving optical system, the one shown in FIG. 11 is given.

In this receiving optical system, a receiving lens 9 condenses received light 5 onto a part having a larger area than that of a light-receiving surface 19 of a light receiving element 10. This light-condensed area can be varied by the radiation angle of the received light 5. The smaller the NAf, the smaller the light-condensed area. That is, as the NAf becomes smaller, the receiving optical system can be used as the one with higher receiving efficiency. Further, even if the received light 5 is directly coupled to the light receiving element 10 without using the receiving lens 9, a similar effect can be obtained. In the above receiving optical system, since it is not required to reduce the light-condensed area, there is an advantage that the optical system can be formed in simple configuration and at low cost.

Figure 14:
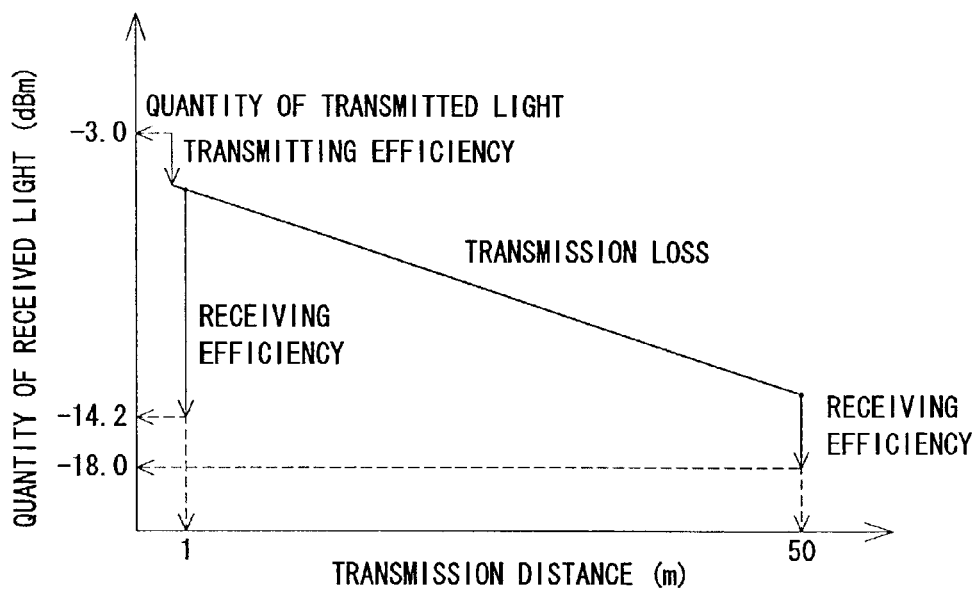
FIG. 14 is a schematic view showing the relationship between the quantity of received light and the transmission distance in an optical communication system of the present invention.

Next, a variation in the received light quantity will be described in the case where the optical communication module 1 shown in FIG. 9 is used for the optical communication modules 1-1 to 1-4 of the optical communication system 3 in the system shown in FIG. 5. The quantity of received light will be discussed assuming that optical fibers 2-1 and 2-2 have lengths of 50 m and 1 m, respectively, and are POFs having a transmission loss of 0.2 dB/m, and that optical systems of the optical communication modules 1 (1-1 to 1-4) are set (namely, the aperture member 8a and the receiving lens 9 are optimized) such that when the transmitted light quantity of −3 dBm and transmitting efficiency of −2 dB, NAf=0.4 and the receiving efficiency is −9 dB for the optical fiber length of 1 m, while NAf=0.2 and the receiving efficiency is −3 dB for the optical fiber length of 50 m. The transmission loss of the optical fiber is 10 dB in the communication performed between the optical communication modules 1-1 and 1-2 (50 m), and 0.2 dB in the communication performed between the optical communication modules 1-3 and 1-4 (1 m). The relationship between the transmission distance and the received light quantity in this case is shown in FIG. 14. Strictly speaking, the transmission loss of the optical fiber 2 is varied depending on the numerical aperture, NAs, of the transmitted light 4, however, the description herein made refers to the principle. Thus, the calculation was conducted, assuming that the transmission losses per unit length of the optical fibers 2 were the same. As a result, the received light quantity was −14.2 dBm when the transmission distance was 1 m, while the received light quantity was −18 dBm when the transmission distance was 50 m. The difference in the received light quantity between them was 3.8 dB.

Figure 15:
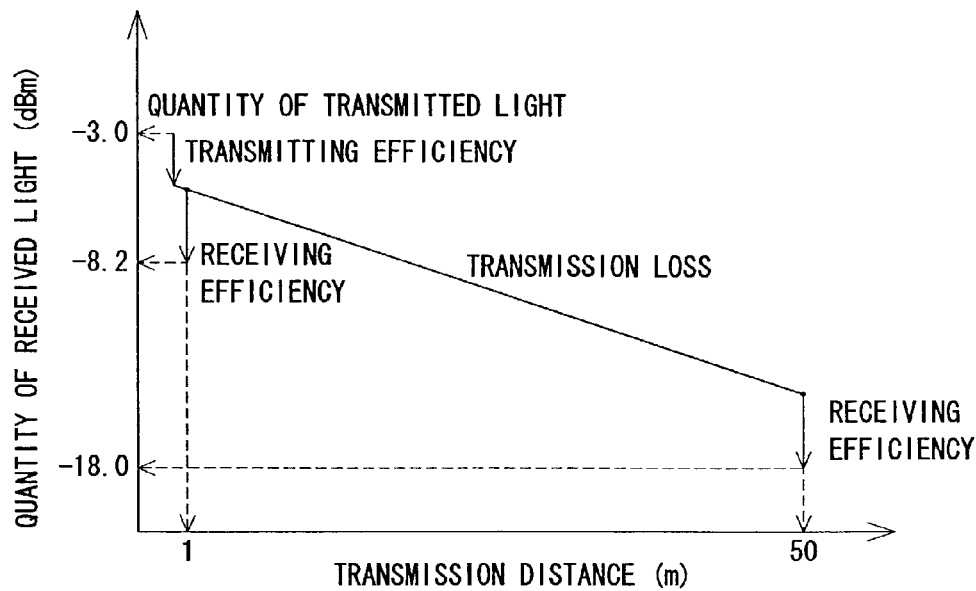
FIG. 15 is a schematic view showing the relationship between the quantity of received light and the transmission distance in a conventional optical communication system.

On the other hand, FIG. 15 shows the relationship between the transmission distance and the received light quantity in the case where applied to the system of FIG. 5 is an optical communication system having conventional optical communication modules (the same conditions as in the first embodiment except for optical communication modules) in which, as the optical characteristics, the transmitted light quantity is −3 dBm, the sending efficiency is −2 dB, and the receiving efficiency is −3 dB. As seen from FIG. 15, the received light quantity between the optical communication modules 1-1 and 1-2 (the transmission distance is 50 m) is −18 dBm, while the received light quantity between the optical communication modules 1-3 and 1-4 (the transmission distance is 1 m) is −8.2 dBm. Thus, a difference of about 10 dB is produced. This difference in the received light quantity is attributable to a difference in length between the optical fibers 2-1 and 2-2 (transmission loss). Therefore, the similar results will be obtained even if the conventional optical communication modules have different optical characteristics.

From the above results, the optical communication system provided with the optical communication modules shown in FIG. 9 of the present invention makes it possible to reduce a variation in the received light quantity depending on the transmission distance to about 4 dB from about 10 dB in the conventional optical communication system (FIG. 15).

The results of variation in the received light quantity depending on the transmission distance shown in FIG. 14 are of the case where the optical communication modules shown in FIG. 9 were used and a single-core one-way communication was performed. But, even if another communication mode is applied, similar values are obtained by the same principle. Also in the optical communication modules shown in FIG. 10, the numerical aperture, NAf, of the received light 5 is varied depending on the length of the optical fiber 2. Thus, by varying the receiving efficiency in accordance with the variation in the numerical value NAf of the received light, it becomes possible to reduce a variation in the received light quantity, when compared with the conventional case.

As described above, the optical communication system 3 of the present embodiment is arranged such that the numerical aperture of the received light 5 is varied depending on the transmission distance by utilizing the relationship between the numerical aperture of the transmitted light 4 and the numerical aperture of the optical fiber 2. The system 3 is also arranged such that the receiving efficiency of the optical communication module 1 is varied depending on the numerical aperture of the received light 5 by configuring the receiving optical system as shown in FIG. 9 or FIG. 10, for example. The above arrangement makes it possible to improve the receiving efficiency when the transmission distance is long. As a result, a variation in the received light quantity due to a difference in the transmission distance can be reduced. This reduction can be achieved by only modifying the optical systems (the transmitting optical system and the receiving optical system) of the optical communication modules 1 and therefore it is possible to obtain an inexpensive, high-performance optical communication system 3 without requiring any complicated systems.

Although FIG. 9 and FIG. 10 show the optical systems performing one-way communication from the left to the right as viewed in the figure for the sake of simplicity, it is a matter of course that the present invention is easily applicable to optical systems performing two-way communication by changing the arrangements of the optical systems.

Figure 16:
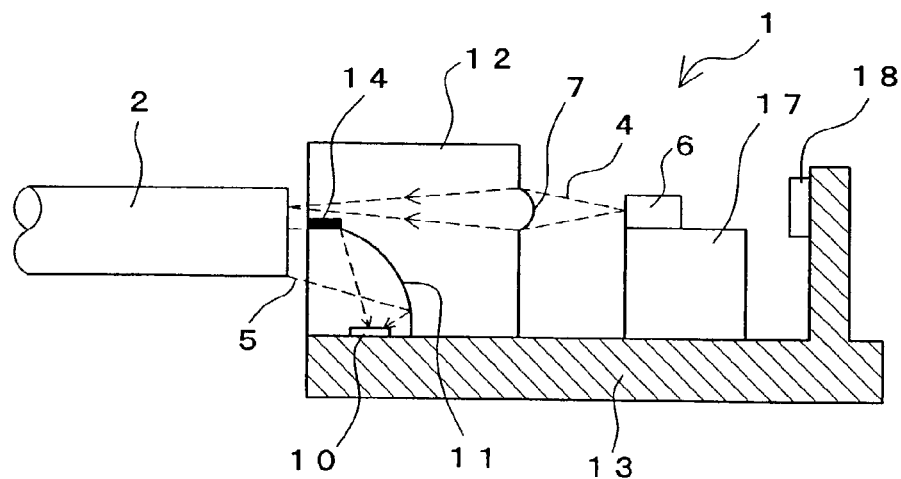
FIG. 16 is a view schematically showing the construction of a specific example of an optical communication module usable in an optical communication system of the present invention.

FIG. 16 schematically shows an optical communication module adapted to perform full duplex communication using an optical fiber 2, as a specific example of the optical communication modules 1 (1-1 to 1-4) to be used in the optical communication system 3 shown in FIG. 5. The optical communication module 1 shown in FIG. 16 has a light emitting element 6 for generating transmitted light 4, which is modulated light based on a data signal, a light receiving element 10 for received light 5 from the optical fiber 2 and generating a data signal, a transmitting lens 7 for condensing the transmitted light 4 radiated from the light emitting element 6 and coupling it to the optical fiber 2, and a reflecting mirror 11 having a curved surface for reflecting the received light 5 radiated from the optical fiber 2 and coupling it to the light receiving element 10. This reflecting mirror 11 has the combined functions of the flat reflecting mirror 11b and the receiving lens 9 shown in FIG. 13. Both the transmitting lens 7 and the reflecting mirror 11 are formed in an optical block 12. The light emitting element 6 is disposed on a submount 17, which is made of material having superior heat radiation characteristics, such as SiC. A monitoring photodiode 18 is arranged at the rear of the light emitting element 6 so that the intensity of the light emitting element 6 is maintained while monitoring. These components are arranged on a stem 13 after positioning. The stem 13 is electrically connected to a circuit that is not shown.

The transmitted light 4 generated by the light emitting element 6 radially diverges according to the angle of radiation of the light emitting element 6. After that, the transmitted light 4 that has diverged is converted to a desired numerical aperture, NAs, and condensed by the transmitting lens 7. The condensed light passes the optical block 12 and is then coupled to the optical fiber 2. On the other hand, received light 5 emitted from the optical fiber 2 is reflected from the reflecting mirror 11 toward the direction of the light receiving element 10, and condensed by the reflecting mirror 11 with a curvature so as to be coupled to the light receiving element 10. That is, a region of the transmitted light 4 and a region of the received light 5 are spatially separated from each other within an aperture of the optical fiber 2, whereby full duplex communication by one optical fiber 2 is performed.

In order to perform full duplex communication with one optical fiber 2, it is required to prevent the transmitted light 4 from interfering with the received light 5. For that purpose, the reflecting mirror 11 has a shielding portion 14, and this shielding portion 14 is arranged in contact with or in proximity to the optical fiber 2. A part of the transmitted light 4 that is incident on the optical fiber 2 is reflected from an end face of the optical fiber 2. However, the light reflected from the optical fiber 2 is blocked by the shielding portion 14 and thus not coupled to the light receiving element 10. In this way, it is possible to prevent the transmitted light 4 from optically interfering with the received light 5. Further, since the reflecting mirror 11 has a function of optically separating the light receiving element 10 from a transmitting part (in FIG. 16, the upper right side of the reflecting mirror 11 where the light emitting element 6 and the transmitting lens 7 are arranged), components of the transmitted light 4 directed toward the optical fiber 2 and components of the transmitted light 4 scattered within the optical communication module 1 (internally scattered light) are prevented from being coupled to the light receiving element 10.

The numerical aperture, NAs, of the transmitted light is set larger than the numerical aperture, NAp, of the optical fiber 2. That is, setting of the numerical aperture of the transmitted light is made such that the numerical aperture, NAf, of the received light 5 increases as the transmission distance increases. The receiving mirror 11 is arranged so as to efficiently receive the received light 5 radiated from an outer peripheral portion of the optical fiber 2. That is, the reflecting mirror 11 is set in a manner such that the receiving efficiency of the optical communication module 1 becomes higher as the numerical aperture, NAf, of the received light increases. The received light 5 received by the light receiving element 10 is subjected to current-voltage conversion by an amplifier (preamplifier) that is not shown. Since the quantity of received light is not varied markedly in this optical communication module 1, the dynamic range of the preamplifier can be set low, thus making it possible to achieve an inexpensive circuit construction. Further, as mentioned above, the mere use of such optical communication modules 1 makes it possible to obtain an optical communication system 3 wherein a variation in the received light quantity due to different transmission distances is small, without changing other systems.

The above-described optical communication systems 3 and optical communication modules 1 used for these systems according to the present embodiment have been given only by way of example, and it should be appreciated that the present invention is not limited to these examples. It is a matter of course that the above-described optical communication systems 3 and optical communication modules 1a may be modified.

(Second Embodiment)

Figure 17:
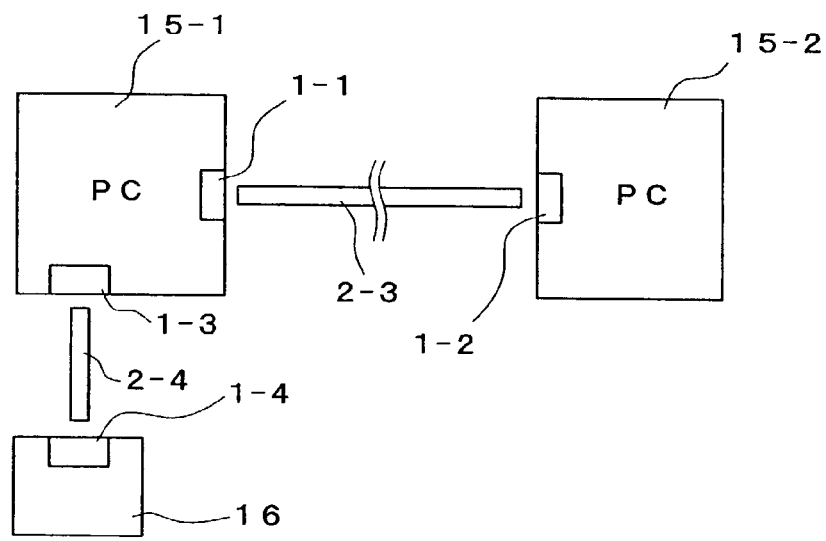
FIG. 17 is a schematic view describing the construction of a second embodiment of the optical communication system of the present invention.

Next, a second embodiment of the optical communication system of the present invention will be described with reference to FIG. 17. In FIG. 17, components which have the same or similar functions as those in FIG. 5 are designated by the same numerals, and their description will be omitted.

In the first embodiment, the optical fibers 2-1 and 2-2 have the same numerical aperture, NAp (that is, the optical fibers 2 having the same characteristics, irrespective of the difference in the transmission distance, were used). Contrary to this, in the second embodiment, optical fibers 2-3 and 2-4 having different numerical apertures NAp1 and NAp2 depending on the transmission distances are used.

In this second embodiment, the numerical aperture, NAf, of received light is varied not by the relationship between the numerical aperture, NAs, of transmitted light and the numerical aperture, NAp, of an optical fiber 2, but by using the optical fibers 2 (2-3 and 2-4) having different numerical apertures NAp1 and NAp2 depending on their transmission distances.

As described above, the numerical aperture, NAf, of the received light 5 is determined by the numerical aperture, NAs, of the transmitted light 4, the numerical aperture, NAp, of the optical fiber 2 and the transmission distance. Needless to say, the larger the numerical aperture, NAp, of the optical fiber 2, the larger the numerical aperture, NAf, of the received light 5. For example, in the case of communication between optical communication modules 1-1 and 1-2 (when the transmission distance is long), an optical fiber 2-3 having a smaller numerical aperture, NAp1, is used, while in the case of communication between optical communication modules 1-3 and 1-4 (when the transmission distance is short), an optical fiber 2-4 having a larger numerical aperture, NAp2, is used. Then, an optical communication module 1 as shown in FIG. 9 in which the receiving efficiency is lowered as the numerical aperture, NAf, of the received light increases is used. Because the optical fibers 2-3 and 2-4 have different numerical apertures, NAp1 and NAp2, the numerical aperture, NAf, of the received light 5 becomes smaller when the transmission distance is long, while the numerical aperture, NAf, of the received light 5 becomes larger when the transmission distance is short. Therefore, it is possible to reduce a variation in the received light quantity owing to the difference in the transmission distance. In this case, since the numerical aperture, NAf, of the received light 5 is varied by the optical fibers 2-3 and 2-4, the numerical aperture, NAs, of the transmitted light 4 of the optical communication module 1 can be selected freely.

The numerical aperture, NAp, of the optical fiber 2 is varied stepwise according to the transmission distance (the length of the optical fiber). For example, it may be varied in the following manner: for the transmission distance of 0–5 m, NAp=0.5; for 5–20 m, NAp=0.4; for 20–50 m, NAp=0.3; and for 50–100 m, NAp=0.2. Contrary to this, it is a matter of course that the numerical aperture, NAp, can be set to increase as the transmission distance increases (NAp1>NAp2). However, when the numerical aperture, NAp, is large, the transmission band is narrowed due to the influence of mode dispersion. Thus, it is preferred to set the numerical aperture, NAp, of the optical fiber 2 such that it becomes smaller when the transmission distance is longer (in the case of the optical fiber 2-3).

As describer above, in the optical communication system of the second embodiment shown in FIG. 17, the numerical aperture, NAf, of the received light is varied by varying the numerical aperture, NAp, of the optical fibers 2 (2-3, 2-4), and the receiving efficiency of the optical communication modules 1 (1-1 to 1-4) is changed depending on the numerical aperture, NAf, of the received light, whereby an optical communication system having a small variation in the received light quantity can be obtained. The above system can be achieved only by the optical fiber 2 and the receiving optical system, an inexpensive optical communication system having a simple construction can be obtained.

(Third Embodiment)

Figure 18:
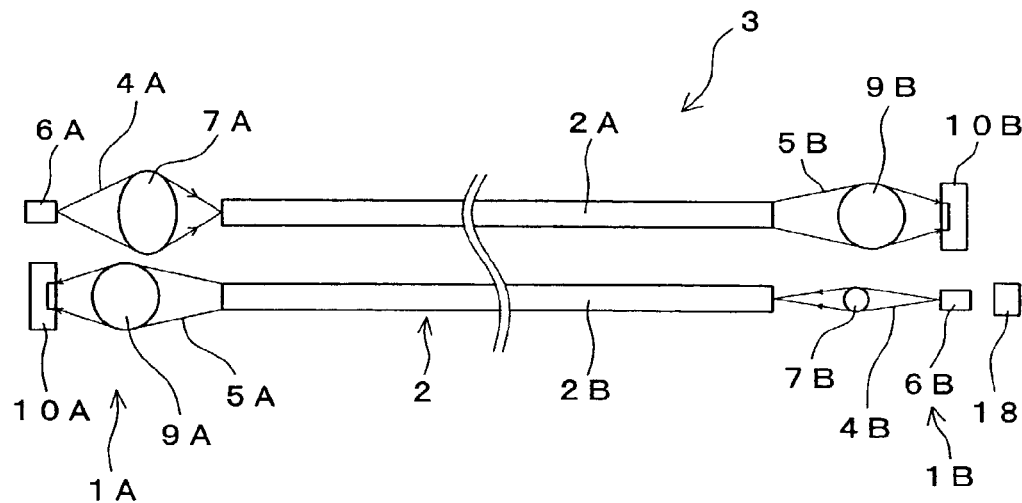
FIG. 18 is a schematic view showing a third embodiment of the present invention.
Figure 19:
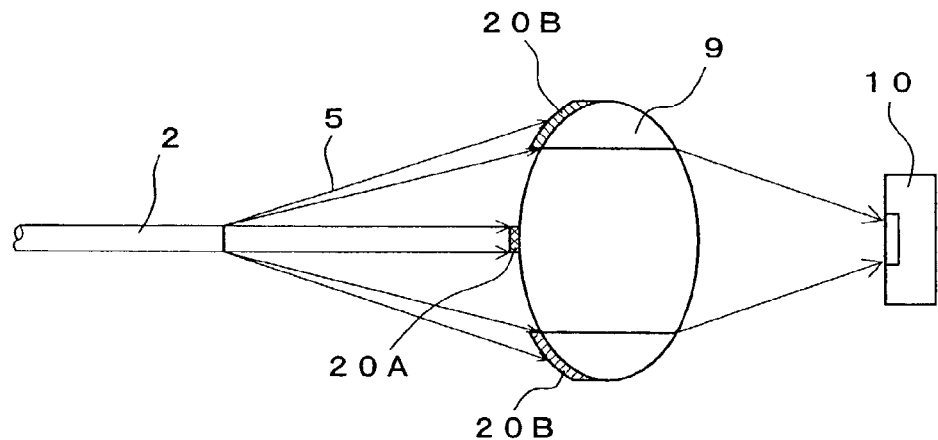
FIG. 19 is a schematic view showing an example of a receiving optical system in the present invention.
Figure 22:
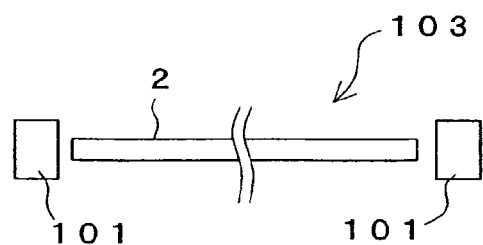
FIG. 22 is a schematic view for explaining the construction of a general optical communication system.

Next, a third embodiment of the optical communication system of the present invention will be described with reference to FIG. 18 and FIG. 19. In FIG. 18 and FIG. 19, components which have the same or similar functions as those of the first and second embodiments are designated by the same reference numerals, and their description will be omitted.

This embodiment is directed to an optical communication system that is suitable when optical communication modules 1 having different communication speeds or different optical characteristics coexist. As one example, an optical communication system 3 as shown in FIG. 18 wherein two-way optical communication is provided using two optical fibers 2 (2A, 2B) will be discussed. Optical communication is provided between a first optical communication module 1A and a second optical communication module 1B using the optical fibers 2 (2A, 2B) as transmission media. The optical fiber 2A is used for transmission from the first optical communication module 1A to the second optical communication module 1B, while the optical fiber 2B is used for the opposite transmission. First transmitted light 4A radiated from a light emitting element 6A of the first optical communication module 1A is condensed by a transmitting lens (transmitting optical system) 7A and coupled to the optical fiber 2A. Received light 5B radiated from the optical fiber 2A is condensed by a receiving lens (receiving optical system) 9B of the second optical communication module 1B, and coupled to a light receiving element 10B. Thereby, optical communication is performed. In a similar manner, optical communication from the second optical communication module 1B to the first optical communication module 1A is provided using the optical fiber 2B. Incidentally, corresponding components in the first and second optical communication modules 1A and 1B are denoted by the same numerals to each of which symbol A or B is appended.

In the optical communication system 3 as above, the first and second optical communication modules 1A and 1B have different maximum transmission speeds (when communication is performed between the modules, the lower speed is used). When the maximum transmission speed of the first optical communication module 1A is lower than that of the second optical communication module 1B, it is preferred that the optical communication system be arranged such that the numerical aperture, NAs1, of the first transmitted light 4A and the numerical aperture, NAs2, of the second transmitted light 4B satisfy the following relationships: NAs1>NAp and NAs2<NAp. As described in the first embodiment, by making the numerical aperture, NAs, of the transmitted light 4 different from the numerical aperture, NAp, of the optical fiber 2, it becomes possible to use a phenomenon in which the numerical aperture, NAf, of the is received light is varied depending on the transmission distance, so that a variation in the received light quantity depending on the transmission distance can be reduced as described in the first embodiment. Further, in some applications of the optical communication system 3, optical communication modules having different communication speeds may be used in combination. For example, in a small-size electronic device, size and cost reductions are prioritized rather than its communication speed, and thus the first optical communication module 1A having a relatively low speed is used. In the first optical communication module 1A, an LED that is low in price is preferably used as a light source. The LED has a large radiation angle. Therefore, setting the numerical aperture NAs1 large would simplify the construction of the transmitting optical system 7A. On the other hand, in the second optical communication module 1B that requires high-speed communication, an LD having a small radiation angle is used as the light source. Therefore, setting the numerical aperture, NAs2, to be small can make the construction of the transmitting optical system 7B simple.

Figure 2:
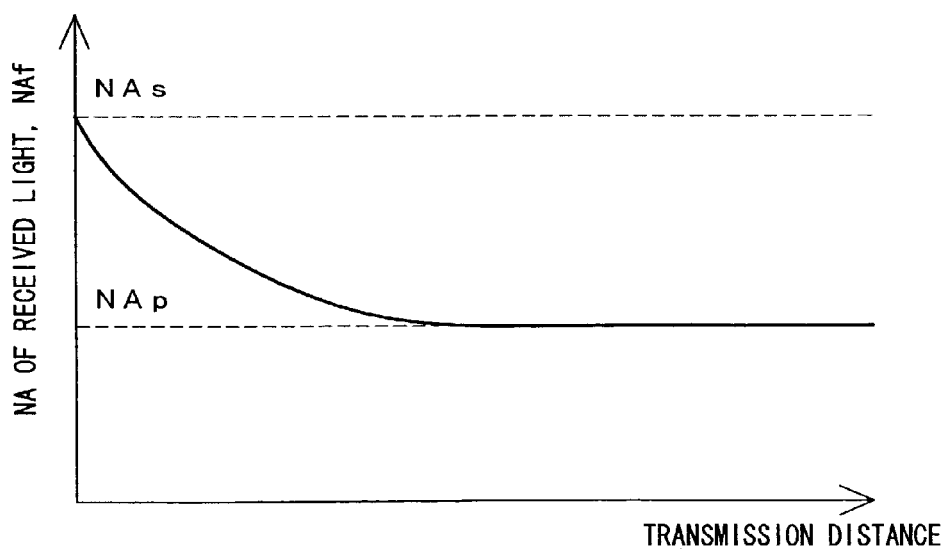
FIG. 2 schematically shows the relationship between the numerical aperture of received light and the transmission distance in the case in which the numerical aperture of transmitted light is larger than the numerical aperture of the optical fiber.
Figure 4:
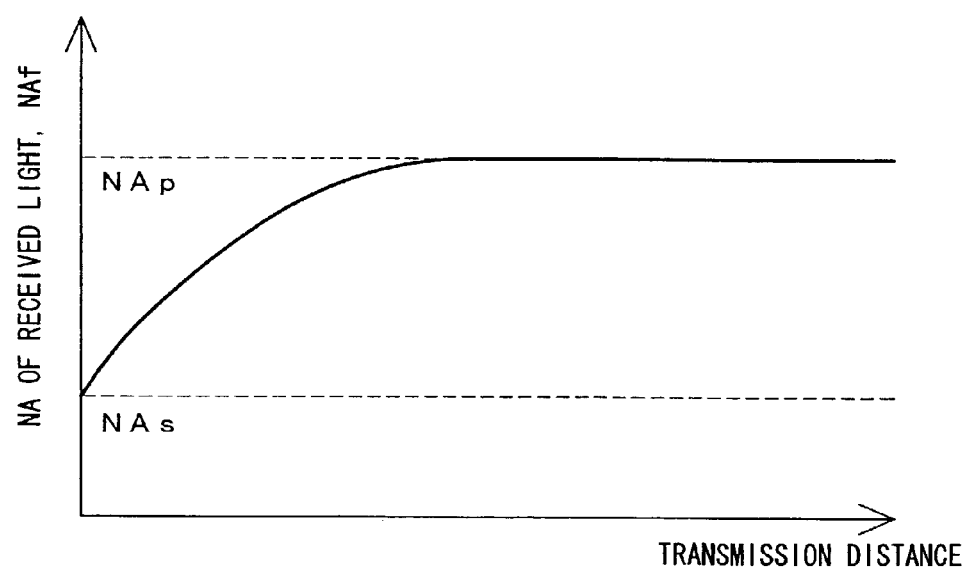
FIG. 4 schematically shows the relationship between the numerical aperture of received light and the transmission distance in the case in which the numerical aperture of transmitted light is smaller than the numerical aperture of the optical fiber.

Furthermore, the optical communication system 3 may include optical communication modules 1 of which the optical characteristics (the numerical aperture, NAs, of the transmitted light 4) are unknown (e.g., optical communication modules 1 manufactured by a different maker). Even if the relationship between the numerical aperture, NAs, of the transmitted light 4 and the numerical aperture, NAp, of the optical fiber 2 is unknown, as shown in FIGS. 2 and 4, it holds that the numerical aperture, NAf, of the radiated light (the received light 5) approaches the numerical aperture, NAp, of the optical fiber 2 when the transmission distance is long. Therefore, the receiving optical system is preferably set such that the receiving efficiency reaches a maximum when the numerical aperture, NAf, of the received light 5 is equal to the numerical aperture, NAp, of the optical fiber 2. The receiving optical system as above can also be used in the case where the optical communication modules 1 having different communication speeds coexist. That is, even if the numerical aperture, NAs, of the transmitted light 4 is larger than the numerical aperture, NAp, of the optical fiber 2, or vice versa, the numerical aperture, NAf, of the received light approaches the numerical aperture, NAp, of the optical fiber 2 as the transmission distance increases. In contrast, when the transmission distance is short, the influence of the numerical aperture, NAs, of the transmitted light remains. Thus, the numerical aperture, NAf, of the received light is different from the numerical aperture, NAp, of the optical fiber 2, though there is a variation in NAf. Accordingly, the receiving optical system of the optical communication module 1 should be arranged such that the receiving efficiency reaches a maximum when the numerical aperture, NAf, of the received light 5 is approximate to the numerical aperture, NAp, of the optical fiber 2 and that the receiving efficiency is lowered as the numerical aperture, NAf, of the received light 5 deviates from the numerical aperture, NAp, of the optical fiber 2.

One example of such a receiving optical system is shown in FIG. 19. In FIG. 19, of all components of the received light 5 radiated from the optical fiber 2, light components having a small radiation angle with respect to the radiation angle corresponding to the numerical aperture of the optical fiber itself are cut off by a shielding portion 20A formed on a part of a receiving lens (receiving optical system) 9, and thus not coupled to a light receiving element 10. Further, light components having a large radiation angle are cut off by shielding portions 20B formed at outer peripheral portions of the receiving lens (receiving optical system) 9, and thus not coupled to the light receiving element 10. That is, in the case of NAf>NAp, components of the received light 5 to be blocked by the shielding portions 20B increase, while in the case of NAf<NAp, components of the received light to be blocked by the shielding portion 20A increase. By optimizing the arrangement or placement of these shielding portions 20A and 20B and the optical characteristics of the receiving lens 9, it becomes possible to obtain a receiving optical system wherein the receiving efficiency reaches a maximum when NAf≈NAp. For example, in the case of NAp=0.3, the receiving optical system is preferably configured and arranged such that the receiving efficiency reaches a maximum when the NAf is in the range of about 0.25–0.35. That is, the receiving optical system is preferably set such that, when the NAf satisfies the relationship of NAp−0.05<NAf<NAp+0.05, the receiving efficiency reaches a maximum. Instead of forming the shielding portions 20B in the outer peripheral portions of the receiving lens 9, the diameter of the receiving lens 9 may be reduced so that light components having a large radiation angle are not coupled to the receiving lens 9. As for the shielding portion 20A at an inner portion of the receiving lens 9, by disposing it in alignment with the optical axis of the optical fiber 2, light components having a small radiation angle can be blocked off. It is a matter of course that the receiving optical system wherein the receiving efficiency reaches a maximum when NAf≈NAp is not limited to the arrangement shown in FIG. 19.

Figure 20:
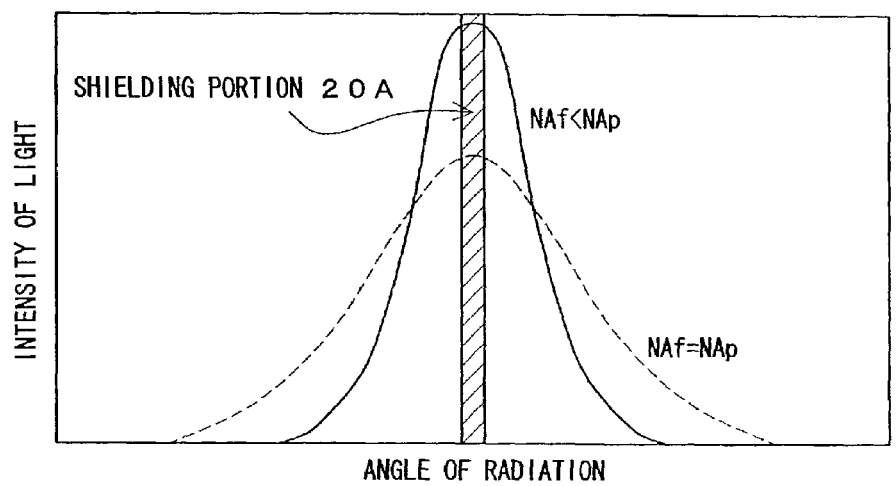
FIG. 20 is an explanatory graph showing the relationship between the numerical aperture, NAf, of received light and the area shielded by a shielding portion 20A.

FIG. 20 shows a portion cut off by the shielding portion 20A in the FFP in cases in which the numerical aperture, NAf, of received light 5 is smaller than the NAp (when an optical fiber 2 is short), and the numerical aperture, NAf, is equal to the NAp (when the optical fiber 2 is long) (that is, communication is performed from the second optical communication module 1B to the first optical communication module 1A). Also when NAf≈NAp, a curve similar to the case of NAf=NAp is obtained. As is apparent from FIG. 20, in the case of NAf<NAp (shown by a solid line), a rate of an area cut off by the shielding portion 20A (namely, a ratio of an integral area of the cut-off portion to an integral area of the graph of the FFP) becomes larger as compared with the case where NAf=NAp (shown by a broken line). That is, the receiving efficiency is lowered. However, it is when the optical fiber 2 is short that NAf<NAp is substantially satisfied. Thus, transmission loss at the optical fiber 2 is small. Accordingly, variation of the received light quantity is suppressed (similar to the first embodiment).

Figure 21:
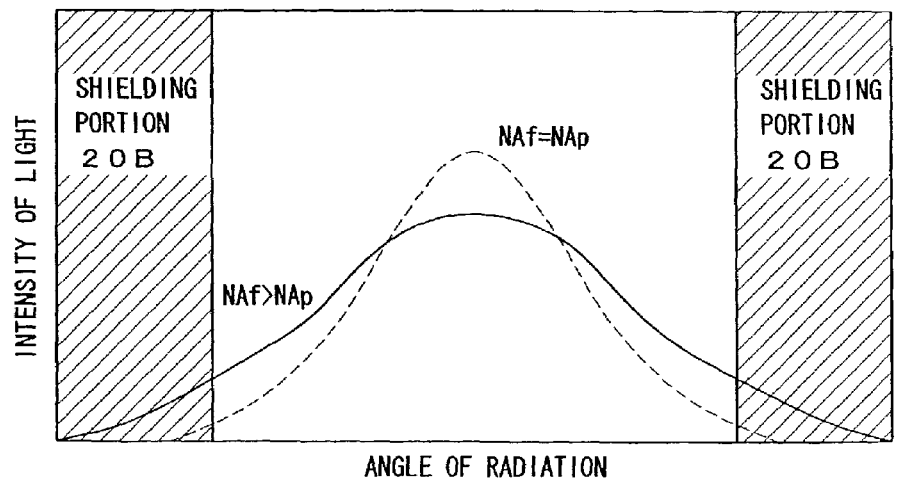
FIG. 21 is an explanatory graph showing the relationship between the numerical aperture, NAf, of received light and the area shielded by shielding portions 20B.

Further, as shown in FIG. 21, in the case of communication from the first optical communication module 1A to the second optical communication module 1B, NAf>NAp holds when the optical fiber 2 is short, opposite to the case shown in FIG. 20. Therefore, the rate of an area cut off by the shielding portions 20B becomes larger in the case of NAf>NAp than in the case of NAf=NAp (hence in the case of NAf≈NAp as well). Although the rate of the area cut off by the shielding portion 20A has a tendency opposite to that of the rate of the area cut off by the shielding members 20B, setting the area cut off by the shielding member 20A to be smaller than that cut off by the shielding members 20B will make the receiving efficiency low when the optical fiber 2 is short. Accordingly, it is possible to reduce a variation in the received light quantity depending on the transmission distance. Furthermore, when communication is provided between the first optical communication modules 1A or between the second optical communication modules 1B, since the receiving efficiency becomes higher when the transmission distance is long (NAf≈NAp), it is possible to reduce a variation in the received light quantity.

As described above, according to the described embodiments, even if optical communication modules having different communication speeds or optical communication modules having unknown optical characteristics are included in an optical communication system, a variation in the received light quantity owing to the difference in the transmission distance can be reduced. Also, the optical communication system can be made inexpensive.

Having been described in detail through the three embodiments, the present invention is applicable to any of the following communication modes: (1) one optical fiber 2 is used, or a plurality of optical fibers are used; (2) two-way communication is performed, or one-way communication is performed; and (3) simultaneous (full duplex) communication is performed, or half duplex communication is performed. The present invention is also applicable to any combination of the above modes (for example, a combined mode in which two-way full duplex communication is performed using a single-core optical fiber).

As is apparent from the above description, according to the present invention, a variation in the received light quantity among optical communication modules due to different transmission distances can be reduced. This makes it possible to obtain an optical communication system having a longer transmission distance. Furthermore, utilizing a phenomenon in which the numerical aperture of received light is varied depending on the transmission distance, a variation in the received light quantity can be reduced. Therefore, the above reduction can be achieved by only optical systems of optical communication modules. Since an extra circuit or a system is not required, there is an effect in that an inexpensive optical communication system having a simple construction can be obtained. The present invention can also be preferably applied to an optical communication system in which optical communication modules having different communication speeds or optical communication modules having different optical characteristics coexist. The above effect can also be achieved in such a case.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An optical communication system performing data communication among a plurality of optical communication modules using at least a first optical fiber and a second optical fiber having a shorter transmission distance than the first optical fiber, comprising:

means for varying numerical aperture of received light radiated from respective optical fibers after having been propagated therethrough, according to transmission distances of the optical fibers; and means for varying receiving efficiency of an optical communication module that receives the received light, according to the numerical aperture of the received light, wherein the means for varying receiving efficiency of an optical communication module varies the receiving efficiency such that $\eta_1 > \eta_2$ holds, where $\eta_1$ represents receiving efficiency of an optical communication module connected to the first optical fiber having the larger transmission distance, and $\eta_2$ represents receiving efficiency of an optical communication module connected to the second optical fiber having the shorter transmission distance.

2. The optical communication system according to claim 1, wherein the means for varying receiving efficiency of an optical communication module makes the receiving efficiency maximum when received light radiated from an associated optical fiber has a numerical aperture approximate to the numerical aperture of this optical fiber.

3. The optical communication system according to claim 1, wherein $NAf1 < NAf2$ and $NAs > NAp$ hold, where $NAf1$ and $NAf2$ represent numerical apertures of received light based on radiated light from the first and second optical fibers, respectively, $NAs$ represents the numerical aperture of transmitted light to enter each optical fiber from an associated optical communication module, and $NAp$ represents the numerical aperture of each optical fiber.

4. The optical communication system according to claim 1, wherein $NAf1 < NAf2$ and $NAp1 < NAp2$ hold, where $NAf1$ and $NAf2$ represent numerical apertures of received light based on radiated light from the first and second optical fibers, respectively, and $NAp1$ and $NAp2$ represent numerical apertures of the first and second optical fibers, respectively.

5. The optical communication system according to claim 1, wherein $NAf1 > NAf2$ and $NAs < NAp$ hold, where $NAf1$ and $NAf2$ represent numerical apertures of received light based on radiated light from the first and second optical fibers, respectively, $NAs$ represents the numerical aperture of transmitted light to enter each optical fiber from an associated optical communication module, and $NAp$ represents the numerical aperture of each optical fiber.

6. The optical communication system according to claim 1, wherein $NAf1 > NAf2$ and $NAp1 > NAp2$ hold, where $NAf1$ and $NAf2$ represent numerical apertures of received light based on radiated light from the first and second optical fibers, respectively, and $NAp1$ and $NAp2$ represent numerical apertures of the first and second optical fibers, respectively.

7. The optical communication system according to claim 1, wherein the plurality of optical communication modules include a first optical communication module and a second optical communication module, and $NAs1 > NAp$ and $NAs2 < NAp$ hold, where $NAs1$ represents the numerical aperture of transmitted light to enter the associated optical fiber from the first optical communication module, $NAs2$ represents the numerical aperture of transmitted light to enter the associated optical fiber from the second optical communication module, and $NAp$ represents the numerical aperture of each optical fiber.

8. The optical communication system according to claim 7, wherein the second optical communication module has a higher maximum communication speed than the first optical communication module.

9. The optical communication system according to claim 1, wherein the means of varying receiving efficiency of an optical communication module prevents light components of radiated light from the optical fiber from being coupled to an associated light receiving element, said light components being light components having a radiation angle smaller than a radiation angle corresponding to the numerical aperture of the optical fiber and/or light components having a radiation angle larger than the radiation angle corresponding to the numerical aperture of the optical fiber.

10. The optical communication system according to claim 1, wherein the means of varying receiving efficiency of an optical communication module comprises an aperture member which transmits only a part of received light radiated from the optical fiber.

11. The optical communication system according to claim 1, wherein the means of varying receiving efficiency of an optical communication module comprises a reflecting mirror which reflects only a part of received light radiated from the optical fiber.

12. The optical communication system according to claim 1, wherein the means of varying receiving efficiency of an optical communication module condenses received light radiated from the optical fiber onto an area larger than that of a light-receiving area of an associated light receiving element.

13. The optical communication system according to claim 1, wherein each optical fiber is a plastic optical fiber.

* * * * *